United States Patent
Lehmann et al.

(10) Patent No.: US 9,620,257 B2
(45) Date of Patent: Apr. 11, 2017

(54) COMPOSITION MADE OF POLYMERS AND ELECTRICALLY CONDUCTIVE CARBON

(75) Inventors: Kathrin Lehmann, Leverkusen (DE); Stefan Stadtmueller, Mülheim an der Ruhr (DE); Peter Schwab, Essen (DE)

(73) Assignee: Evonik Degussa GmbH, Essen (DE)

( * ) Notice: Subject to any disclaimer, the term of this patent is extended or adjusted under 35 U.S.C. 154(b) by 421 days.

(21) Appl. No.: 13/883,207

(22) PCT Filed: Nov. 2, 2011

(86) PCT No.: PCT/EP2011/069193
§ 371 (c)(1),
(2), (4) Date: May 2, 2013

(87) PCT Pub. No.: WO2012/059489
PCT Pub. Date: May 10, 2012

(65) Prior Publication Data
US 2013/0214211 A1    Aug. 22, 2013

(30) Foreign Application Priority Data
Nov. 5, 2010  (DE) .......................... 10 2010 043 472

(51) Int. Cl.
*H01B 1/04*    (2006.01)
*C08K 5/17*    (2006.01)
*C08K 7/24*    (2006.01)

(52) U.S. Cl.
CPC ................. *H01B 1/04* (2013.01); *C08K 5/17* (2013.01); *C08K 7/24* (2013.01)

(58) Field of Classification Search
None
See application file for complete search history.

(56) References Cited

U.S. PATENT DOCUMENTS

| | | | |
|---|---|---|---|
| 5,880,193 A | 3/1999 | Berke et al. | |
| 7,109,258 B1* | 9/2006 | Valeri et al. | 523/457 |
| 2002/0022142 A1* | 2/2002 | Harada | 428/493 |
| 2004/0167268 A1* | 8/2004 | Vathauer et al. | 524/445 |
| 2004/0235984 A1* | 11/2004 | Nicholl | B82Y 30/00 523/200 |
| 2008/0114105 A1* | 5/2008 | Hell et al. | 524/155 |
| 2008/0248311 A1* | 10/2008 | Suh et al. | 428/408 |
| 2008/0281014 A1* | 11/2008 | Momose et al. | 522/71 |

FOREIGN PATENT DOCUMENTS

DE    195 16 387    11/1996
DE    10 2006 031952    1/2008

* cited by examiner

*Primary Examiner* — Harold Pyon
*Assistant Examiner* — Katie L Hammer
(74) *Attorney, Agent, or Firm* — Frommer Lawrence & Haug LLP

(57) ABSTRACT

Polymer compositions which are antistatic or have been made conductive and the production thereof.

14 Claims, 1 Drawing Sheet

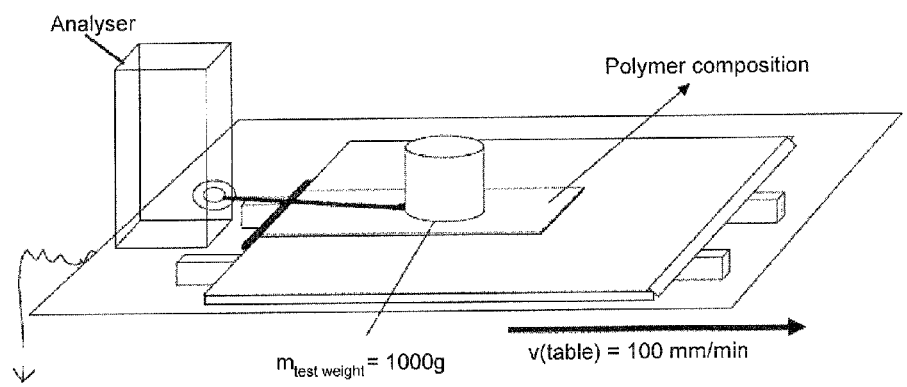

COMPOSITION MADE OF POLYMERS AND ELECTRICALLY CONDUCTIVE CARBON

The present application claims priority from PCT Patent Application No. PCT/EP2011/069193 filed on Nov. 2, 2011, which claims priority from German Patent Application No. DE 10 2010 043 472.8 filed on Nov. 5, 2010, the disclosures of which are incorporated herein by reference in their entirety.

1. FIELD OF THE INVENTION

The invention relates to polymer compositions, in particular for thermoplastics or thermosets, which contain electrically conductive carbon substrates such as carbon black, carbon fibres, graphite, graphene and/or CNTs (carbon nanotubes) and also salts having a nonmetallic cation or a synergistic mixture of these salts together with metal salts, where the combination with specific dispersants is essential.

It is noted that citation or identification of any document in this application is not an admission that such document is available as prior art to the present invention.

Plastics are generally and except for a few very specific exceptions electrical insulators on which high surface charges can accumulate during production, processing and use of films or mouldings produced therefrom.

These static charges lead to undesirable effects and serious hazard situations which extend from attraction of dust, adhesion of hygienically problematical contaminants, destruction of electronic components through arcing, physiologically unpleasant electric shocks, ignition of combustible liquids in containers or tubes in which these liquids are stirred, poured or conveyed to dust explosions, for example when transferring the contents of large containers filled with dusts or finely ground material or in quarrying or coal mining.

Ever since the use of these plastics, there has therefore been the necessity of preventing static charges or else minimizing them to such an extent that they are no longer hazardous.

Plastics which are formulated into such polymer compositions can be divided into the main groups of thermoplastics and thermosets.

For the present purposes, polymers which have a flow transition range above the use temperature are designated as thermoplastics. Thermoplastics are linear or branched polymers which in the case of amorphous thermoplastics in principle become flowable above the glass transition temperature (Ig) and in the case of (partially) crystalline thermoplastics in principle become flowable above the melting point (Tm). They can be processed in the softened state by pressing, extrusion, injection moulding or other shaping methods to give mouldings. Here, the chain mobility becomes so great that the polymer molecules easily slide against one another and the material attains the molten state (flow range, polymer melt). Furthermore, thermoplastics also include thermoplastically processable plastics having pronounced entropy-elastic properties, known as thermoplastic elastomers. Thermoplastics include all plastics consisting of linear or thermolabily crosslinked polymer molecules, for example polyolefins, vinyl polymers, polyesters, polyacetals, polyacetates, polycarbonates, in part also polyurethanes and ionomers and also TPEs, viz. thermoplastic elastomers (RÖMPP ONLINE, Vers. 3.7, Carlowitz and Wierer, Kunststoffe (instructions), 1$^{st}$ Chapter Thermoplaste, Berlin: Springer Verlag (1987), Domininghaus, p. 95 ff).

Thermosets are synthetic resins which are formed from oligomers (technically: prepolymers), more rarely from monomers or polymers, by irreversibly and tight crosslinking via covalent bonds. The word "thermoset" is used both for the raw materials before crosslinking (see reactive resins) and as collective term for the cured, usually completely amorphous, resins. Thermosets are steel-elastic at low temperatures and at relatively high temperatures they cannot display viscous flow but are elastic at a very limited deformability. Thermosets include, inter alia, the industrially important groups of diallyl phthalate resins (DAP), epoxy resins (EP), urea-formaldehyde resins (UF), melamine-formaldehyde resins (MF), melamine-phenol-formaldehyde resins (MPF), phenol-formaldehyde resins and unsaturated polyester resins (UPES) (RÖMPP ONLINE, Vers. 3.7, Becker, G. W.; Braun, D.; Woebcken, W, Kunststoff-Handbuch, Volume 10: Duroplaste, 2$^{nd}$ edition; Hanser: Munich (1988); Elias (6.) 1, 7, 476 ff).

Significantly high performance for conducting away electric charges even has to be achieved when plastics are to be used in electronic components of large appliances, e.g. in the transformer or substation production sector, or in many applications in automobile and aircraft construction. The typical plastics which have been made antistatic essentially by the use of internal antistatics, e.g. fatty amine ethoxylates or glycerol or polyglycerols, or by spraying-on of external antistatic solutions which dry on the surface of the plastic, e.g. ammonium or alkali metal salt solutions, are not satisfactory for this purpose.

A generally employed method for making it possible for charges to be conducted away and the static charge to be minimized is the use of antistatics, i.e. nonionic or ionic interface-active compounds and in particular ammonium and alkali metal salts.

Essentially external and/or internal antistatics are used at the present day.

External antistatics are applied as aqueous or alcoholic solutions to the surface of the plastics by spraying, painting or dipping and subsequent drying in air. The antistatic film which remains is effective on virtually all plastics but has the disadvantage that it can be removed again very easily and unintentionally by means of friction or liquid.

Owing to the lack of a depot effect of antistatic molecules migrating from the interior of the polymer composition (as is present in the case of internal antistatics), external antistatics do not have any long-term effect.

Preference is therefore given to using internal antistatics which are added as far as possible in pure form, otherwise in the form of "masterbatches", i.e. concentrated formulations, to the polymer composition before or during processing and are homogeneously distributed therein during the injection or extrusion process.

EP 2 038 337 refers to polymer compositions comprising polymers and ionic liquids and metal salts which together with glycols as solvents and solubilizers can impart antistatic properties to the polymer compositions. Carbon substrates are not used here.

EP 1 519 988 describes polymer compositions comprising polymers together with ionic liquids and the antistatic action thereof. Carbon substrates or metal salts are not used here.

A disadvantage of both publications is that only small proportions of antistatic can be introduced into the polymer if the mechanical properties of the polymers are not to be adversely affected.

Typical thermoplastics have specific surface resistances in the range from $10^{16}$ to $10^{14}$ ohm ($\Omega$) and can therefore build up voltages of up to 15 000 volt. Effective antistatics can reduce the specific surface resistances of the plastics to from $10^{10}$ to $10^9$ ohm. On the other hand, a significantly higher performance for conducting away electric charges has to be achieved if plastics are to be used in electronic components of large appliances, e.g. in the transformer or substation manufacturer sector, or in many applications in automobile and aircraft construction. Here, it is necessary to use electrically conductive moulding compositions which have to have a specific surface resistance of less than $10^9$ ohm. A critical factor here is that in such uses of plastics, not only the surface resistance but also the volume resistance through plastic parts having a thickness of up to a plurality of millimeters has to be in such a range, and in the case of parts produced by injection moulding, anisotropy effects frequently occur and are generally difficult to suppress.

For the manufacture of conductive plastic mouldings, there is therefore only the possibility of either using conductive plastics such as polyanilines and the like or making the abovementioned plastics, which are electrical insulators, conductive by use of carbon blacks, in particular conductive carbon blacks, carbon fibres, graphite, graphene and/or CNTs.

Conductive carbon blacks are fractal structures which on mutual contact are able to conduct the electric charge further in the polymer and also guarantee a low volume resistance. This generally requires a high degree of fill in the range from 15 to 25% by weight, which not only has an adverse effect on the technical polymer properties, especially in respect of the mechanical parameters such as notched impact toughness or tensile strength, but also results in an unsatisfactory surface quality for components in visible positions, as is complained of by industry.

The term conductive carbon blacks refers to specific industrial carbon blacks which are produced, inter alia, by the furnace black process or by thermal dissociation by means of the acetylene black process. Their DBP (dibutyl phthalate) value is above 110 ml per 100 g of carbon black, indicating an extremely high specific surface area. Typical commercial products are, for example, Akzo Ketjenblack EC or Evonik Printex XE2 or Printex L6.

In comparison, carbon fibres or carbon nanotubes (CNTs) and especially graphene can be used in significantly lower concentrations, but dispersing them is extremely process-dependent. For example, how the CNTs are introduced in the region of the intake/feed opening into the extrusion screw and which screw configuration is selected in an extrusion process are critical to the later effectiveness. These are only a few relevant process parameters which stand in the way of any simple use. Furthermore, the costs of carbon fibres or CNTs are considerably above the price of conductive carbon blacks, and graphene is even more expensive, so that it is immediately clear that there is a further need for optimization in reducing the carbon fibre or CNT concentration. In addition, in the case of some plastics, dispersing these products is particularly difficult since the melt viscosity and the polarity of some thermoplastics oppose this.

Carbon nanotubes are a further modification of the element carbon in addition to graphite, diamond, amorphous carbon and fullerenes. The carbon atoms in carbon nanotubes are arranged in hexagons. The structure corresponds to a rolled-up monoatomic or multiatomic layer of graphite, so that a hollow cylinder having diameters of typically a few nanometers and a length up to a few millimeters is formed. A fundamental distinction is made between multiwalled and single-walled carbon nanotubes, in the literature usually abbreviated to MWNTs and SWNTs. Owing to the van der Waals forces, carbon nanotubes display a strong tendency to agglomerate into bundles, which is why disentangling/dispersing without severe shortening by high shear forces is essential in the extrusion process. Typical commercial products can be obtained from various manufacturers, and mention may be made by way of example of the companies Bayer, Cyclics (formerly Electrovac), Nanocyl and Arkema which offer the grades Baytubes®C150P, Baytubes®C 150 HP, Baytubes® C 70P, Electrovac HTF 110 FF, Nanocyl™ NC 7000 and Graphistrength C100. Further manufacturers offer CNTs in the form of masterbatches, for example Hyperion and C-Polymers.

Metal salts are known and effective antistatics. However, they have the disadvantage that they have to be dissolved before use to achieve homogeneous distribution in plastics. Conventional solvents are alcohols, ethers, esters, polyethers, cyclic ethers, cyclic esters, amides, cyclic amides, aromatic compounds or organic solvents quite generally.

However, the solubility of the metal salts is sometimes very low, and large amounts of solvent therefore have to be used to achieve sufficient effective use concentrations.

Such amounts of solvent as additive in the polymer compositions cannot be processed in either large or small amounts in extrusion processes in the melting of the thermoplastics and incorporation of the conductive carbon-based products for safety reasons, and were also unacceptable in respect of the resulting plasticizing properties for the mechanical parameters of the polymer compositions since although a deviation from mechanical properties is tolerable, this must generally be no more than 10% below the initial value of the filled polymer without use of the additives, in the present case, for example, the metal salt together with the necessary solvent.

If such antistatic formulations are used in plastics, they have the disadvantage that they have an adverse effect on the optical and especially the physical properties of the end product.

In industrial practice, there is therefore a need to improve the dispersing of electrically conductive carbon blacks, carbon fibres, graphite, graphene and/or CNTs so as to make it possible to manufacture mouldings which have a smooth surface and/or have a low surface and volume resistance at a lower content of the abovementioned constituents or enable an even lower surface and volume resistance to be ensured at the same content.

Such plastics moulding compositions frequently have to be made electrically dissipative or antielectrostatic or electrically conductive, with the following applications being particularly prominent at present:

prevention of static charging, e.g. in packaging, in metering systems for aerosols, powders or liquids, in fuel lines and, for example, in electronic components such as chip supports, where for safety reasons electrostatic charging has to be prevented, electromagnetic shielding of electric appliances and electronic assemblies, e.g. in motor vehicle, EDP, news and communications technology, and utilization of the electrical conductivity, e.g. potential control in cables, current-dependent switching elements, heating elements, or for electrostatic surface coating of parts made of plastic. Electrostatic surface coating has become established in recent years in a large number of sectors, in particular in the motor vehicle industry. A prerequisite for electrostatic surface coating is the ability to electrically charge the mouldings to be coated. This is easy in the case of metals, but is normally not possible to a sufficient extent in the case of conventional thermoplastics because of their low conductivity.

However, in the compounding of polymers with conductive fillers, agglomerates of incompletely dispersed fillers frequently occur and these limit the product quality of the composition. For example, such agglomerates can lead to surface defects which cannot be tolerated for the application. In addition, the conductivity achieved falls far short of the maximum possible conductivity at a given concentration of conductive filler.

The quality of dispersion can, for example, be assessed by optical microscopic examination of thin slices, with the proportion by area of agglomerates being measured.

It is noted that in this disclosure and particularly in the claims and/or paragraphs, terms such as "comprises", "comprised", "comprising" and the like can have the meaning attributed to it in U.S. patent law; e.g., they can mean "includes", "included", "including", and the like; and that terms such as "consisting essentially of" and "consists essentially of" have the meaning ascribed to them in U.S. patent law, e.g., they allow for elements not explicitly recited, but exclude elements that are found in the prior art or that affect a basic or novel characteristic of the invention.

It is further noted that the invention does not intend to encompass within the scope of the invention any previously disclosed product, process of making the product or method of using the product, which meets the written description and enablement requirements of the USPTO (35 U.S.C. 112, first paragraph) or the EPO (Article 83 of the EPC), such that applicant(s) reserve the right to disclaim, and hereby disclose a disclaimer of, any previously described product, method of making the product, or process of using the product.

SUMMARY OF THE INVENTION

In the light of the background, it was an object of the invention to improve the dispersing of electrically conductive fillers in the polymers mentioned. In one aspect of the object, the surface quality of the moulding composition should be improved in this way. In a further aspect of the object, the electrical conductivity should be improved as a given content of electrically conductive filler or a lower filler content should be required for achieving a desired conductivity.

It has surprisingly been found that particular dispersants as additives in the polymers in combination with salts having a nonmetallic cation are able to achieve this object. Very polar structures based on esters or amides as dispersants together with the completely nonpolar carbon-based additives can surprisingly achieve this object even in nonpolar polymers.

This object is achieved by the use of particular additives in order to achieve an improvement in dispersion.

BRIEF DESCRIPTION OF THE DRAWINGS

FIG. 1 shows principle of carrying out the measurement of a coefficient of friction in accordance with DIN EN ISO 8295.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

The invention accordingly provides polymer compositions comprising the following components:
 a) at least 40 parts by weight, preferably at least 50 parts by weight and particularly preferably at least 60 parts by weight, of a polymer selected from the group of polymers consisting of
  a1) thermoplastics, in particular linear or branched polymers or (partially) crystalline thermoplastics, thermoplastic elastomers, linear or thermolabily crosslinked polymer molecules, where the thermoplastics are preferably selected from among polyolefins, polypropylene or polyethylene, polystyrene, vinyl polymers, polyesters, polyether polyols, polyacetates such as polyvinyl acetate, polyacetals, polycarbonates, thermoplastic polyurethanes and ionomers and also TPEs, viz. thermoplastic elastomers, and also specific polyamides whose monomer units contain an average of less than 7.5 carbon atoms, e.g. PA46, PA6, PA66, CoPA6/66, polyphthalamides based on terephthalic acid and/or isophthalic acid and hexamethylenediamine and/or 2-methylpentanediamine and optionally those which can contain caprolactam or hexamethylenediamine/adipic acid or derivatives thereof as comonomers,
   where the polymers can be used either alone or in any mixtures or as copolymers, and
  a2) thermosets, in particular those which are obtained from oligomers (technically prepolymers), more rarely from monomers or polymers, by irreversible and tight crosslinking via covalent bonds, where the thermosets are preferably selected from the group consisting of amorphous resins, diallyl phthalate resins (DAP), epoxy resins (EP), urea-formaldehyde resins (UF), melamine-formaldehyde resins (MF), melamine-phenol-formaldehyde resins (MPF), phenol-formaldehyde resins and/or unsaturated polyester resins (UPES),
   where the polymers can be used either alone or in any mixtures or as copolymers, where the thermoplastics and thermosets can be used either alone or in any mixtures,
  with the proviso that polymer a) is not a polyamide whose monomer units have an arithmetic mean of at least 7.5 carbon atoms and in particular is not polyamide 12,
 b) from 0.1 to 15 parts by weight, preferably from 1 to 12 parts by weight and particularly preferably from 2.5 to 10 parts by weight, of at least one salt having a nonmetallic cation,
 c) from 0.1 to 25 parts by weight, preferably from 0.5 to 25 parts by weight, more preferably from 1 to 20 parts by weight and particularly preferably from 2 to 15 parts by weight, of at least one dispersant based on esters or amides and
 d) an electrically conductive carbon selected from the group consisting of carbon black, graphite powders, carbon fibres, carbon nanotubes and graphene in an amount which in the polymer composition gives a specific surface resistance in accordance with IEC 60167 of from $10^{-1}$ to $10^{10}\Omega$, preferably from $10^0\Omega$ to $10^8\Omega$ and particularly preferably from $10^{-1}\Omega$ to $10^6\Omega$, with preference being given to less than 20 parts by weight of an electrically conductive carbon.

The component a) of the polymer composition of the invention preferably consists of one or more of the thermoplastics and/or thermosets mentioned under a1) and a2), respectively.

In addition, the polymer composition can optionally contain
  e) from 0 to 5 parts by weight, preferably from 0.1 to 3 parts by weight and particularly preferably from 0.1 to 2 parts by weight, of at least one metal salt and
  f) customary auxiliaries and additives,
where the sum of the parts by weight of the components a) to f) is 100.

In a possible embodiment, the polymer composition contains
  from 0.1 to 10 parts by weight, preferably from 0.5 to 5 parts by weight and particularly preferably from 1 to 3.5 parts by weight, of component b),
  from 1 to 10 parts by weight, preferably from 1.5 to 8 parts by weight and particularly preferably from 2 to 5 parts by weight, of component c),
  from 1 to 10 parts by weight, preferably from 2 to 8 parts by weight and particularly preferably from 2.5 to 6 parts by weight, of carbon nanotubes as component d) and
  from 0 to 5 parts by weight, preferably from 0.1 to 4 parts by weight and particularly preferably from 0.5 to 3 parts by weight, of component e),
where, here too, the sum of the parts by weight of components a) to f) is 100.

In a further possible embodiment, the polymer composition also has a specific volume resistance in accordance with IEC 60093 of not more $10^9$ $\Omega$m (ohm*m), preferably from $10^{-3}$ $\Omega$m to $10^7$ $\Omega$m and particularly preferably from $10^{-1}$ $\Omega$m to $10^5$ $\Omega$m.

Usually, stearates or waxes are employed as dispersants in the thermoplastic polymer applications, at least in the polyolefins which are processed at low temperatures (from 160° C. to 220° C.). However, stearates and polyolefin waxes based on PE, PP or EVA (ethylene-vinyl acetate) are thermally labile constituents since even at temperatures below 200° C. they can display a weight loss, determined by means of thermogravimetric analysis, in the region of >10% by weight. In addition, stearates in particular have the additional disadvantage that they decompose to form crusty deposits on the hot internal parts of the extruder and the screw, and these then either lead to difficult cleaning operations and downtimes of machines or lead to inhomogeneities due to sudden entrainment of the encrustations, which do not melt again, in the extrusion stream, leading to blockage of the extruder at the outlet/die (known as die drool phenomenon). In addition, such blockages ultimately lead to unacceptable surfaces on the injection-moulded parts.

The thermolability of such dispersants is particularly critical because of the high degrees of fill with carbon-based products, since the removal of heat in the interior of the extrusion is more difficult than in the case of conventional masterbatch and compounding processes. The causes are the high surface areas which in the text above have already been explained by characterization of such carbon-based surfaces by means of the DBP values.

In the case of thermal decomposition or if parts of the polymer compositions burn onto the internal parts of the screw, stoppage and even tearing-off of the screw shafts of the extruder can occur. Waxes, which tend to lower the viscosity, are used in an attempt to prevent this, but over-lubrication frequently occurs and the polymer compositions in practice leave the compounding/extrusion so fast that sufficient dispersion of the carbon-based constituents does not occur, which in turn shows up in unsatisfactory values for the reduction of the surface or volume resistance.

In the case of industrial polymers which require processing temperatures of from 200° C. to 400° C., these thermolabile dispersants therefore cannot be used.

In the classical, known thermoset polymer compositions, either no dispersants or dispersants other than those in the thermoplastic compositions are employed. The limitation to the dispersants used is here less in the discussion of the thermolability but rather in the insufficient lowering of the viscosity in order to introduce sufficient amounts of carbon-based constituents for an appropriate antistatic action or conductivity. Typical dispersants which can be used there are, for example, polyurethanes or else specific polyether-based structures. Thus, for example, significant additions of styrene are incorporated in unsaturated polyester resins but these partially evaporate before curing of the thermoset system and are therefore also hazardous to health. The abovementioned dispersants do not display a satisfactory reduction in the viscosity which is necessary for dispersion in the continuous phase in order to introduce shear forces which allow dispersion when a high-speed stirrer, e.g. from Getzmann, is used. Since such thermoset systems are, for example, cast in order to guarantee, for example, antistatically conductive surfaces in the aircraft or automobile sector, the lowering of the viscosity is also a use parameter which can show up in an unsatisfactory surface quality.

The salts having a nonmetallic cation which are used according to the invention as component b) are preferably composed of at least one quaternary nitrogen and/or phosphorus compound and at least one anion, where the cation is particularly preferably selected from the group consisting of substituted ammonium, phosphonium, pyridinium, imidazolinium and imidazolium cations and especially preferably from the group consisting of acyclic quaternary ammonium, 1,3-dialkylimidazolium, 1,2,3-trialkylimidazolium, 1,3-dialkylimidazolinium and 1,2,3-trialkylimidazolinium cations, where the different charges of the cations and anions balance overall in each case.

As salts having a nonmetallic cation, it is possible, according to the invention, to use the following compounds.

The type of anions in the salt of component b) is not critical. The anions are selected from the group consisting of halides, carboxylates, phosphates, thiocyanates, isothiocyanates, dicyanamide, sulphates, hydrogensulphate, alkylsulphates and arylsulphates, polyether sulphates and polyether sulphonates, perfluoroalkylsulphates, sulphonate, alkylsulphonates and arylsulphonates, perfluorinated alkylsulphonates and arylsulphonates, sulphonates, tetrafluoroborates, hexafluorophosphates, bis(perfluoroalkylsulphonyl)amides or bis(perfluoroalkylsulphonyl)imides, bis(trifluoromethylsulphonyl)imide, alkyltosylates and aryltosylates, perfluoroalkyltosylates, nitrates, alkylcarboxylates and arylcarboxylates, perfluoroalkylcarboxylates, perchlorate, tetrachloroaluminate, saccharinate, dicyanamide, thiocyanate, isothiocyanate, tetraphenylborate, tetrakis(pentafluorophenyl)borate, tetrafluoroborate, hexafluorophosphate, polyether phosphates and/or phosphate, which are combined with cations of quaternary nitrogen and/or phosphorus compounds, preferably selected from the group consisting of substituted ammonium, phosphonium, pyridinium, imidazolinium and imidazolium cations and especially preferably from among acyclic quaternary ammonium and 1,3-dialkylimidazolium, 1,2,3-trialkylimidazolium, 1,3-dialkylimidazolinium and 1,2,3-trialkylimidazolinium cations, where the charges within the anion-cation combinations balance and mixtures of different salts can also be used.

The salts having a nonmetallic cation which are preferably used in the polymer compositions of the invention comprise at least one cation of the general formulae:

(1)

(2)

(3)

(4)

where $R^1$, $R^2$, $R^3$, $R^4$ can be identical or different and are each hydrogen, a linear or branched or double bond-containing aliphatic hydrocarbon radical having from 1 to 30 carbon atoms or a saturated or unsaturated, optionally double bond-containing cycloaliphatic hydrocarbon radical having from 5 to 40 carbon atoms, an aromatic hydrocarbon radical having from 6 to 40 carbon atoms, an alkylaryl radical having from 7 to 40 carbon atoms, a linear or branched, optionally unsaturated aliphatic hydrocarbon radical which has from 2 to 30 carbon atoms and is interrupted by a radical containing one or more heteroatoms, e.g. oxygen, —NH—, —NR'—, a linear or branched or double bond-containing aliphatic hydrocarbon radical which has from 2 to 30 carbon atoms and is interrupted by one or more functions selected from the group consisting of —O—C(O)—, —(O)C—O—, —NH—C(O)—, —(O)C—NH, —(CH₃)N—C(O)—, —(O)C—N(CH₃)—, —S(O₂)—O—, —O—S(O₂)—, —S(O₂)—NH—, —NH—S(O₂)—, —S(O₂)—N(CH₃)—, —N(CH₃)—S(O₂)—, a linear or branched or double bond-containing aliphatic or cycloaliphatic hydrocarbon radical which has from 1 to 30 carbon atoms and is terminally functionalized by —OH, —OR', —NH₂, —N(H)R', —N(R')₂ or a polyether —(R⁵—O)ₙ—R⁶ having a block or random structure, where R' is a saturated or unsaturated $C_1$-$C_{30}$-alkyl radical, in particular —CH₃, $R^5$ is a linear or branched hydrocarbon radical containing from 2 to 4 carbon atoms, n is from 1 to 100, preferably from 2 to 60, and $R^6$ is hydrogen, a linear or branched or double bond-containing aliphatic hydrocarbon radical having from 1 to 30 carbon atoms, or a double bond-containing cycloaliphatic hydrocarbon radical having from 5 to carbon atoms, an aromatic hydrocarbon radical having from 6 to carbon atoms, an alkylaryl radical having from 7 to 40 carbon atoms or a radical —C(O)—R⁷ where $R^7$ is a linear or branched or double bond-containing aliphatic hydrocarbon radical having from 1 to 30 carbon atoms or a double bond-containing cycloaliphatic hydrocarbon radical having from 5 to 40 carbon atoms or an aromatic hydrocarbon radical having from 6 to 40 carbon atoms or an alkylaryl radical having from 7 to 40 carbon atoms.

Further possible cations are ions which are derived from saturated or unsaturated cyclic compounds and from aromatic compounds having in each case at least one trivalent nitrogen atom in a 4- to 10-membered, preferably 5- or 6-membered, heterocyclic ring which may be further substituted. Such cations can be described in simplified form, (i.e. without indication of precise position and number of double bonds in the molecule) by the general formulae (5), (6) and (7) below, where the heterocyclic rings may optionally also contain a plurality of heteroatoms

(5)

(6)

(7)

and the substituents have the following meanings

R is hydrogen, a linear or branched optionally double bond-containing aliphatic hydrocarbon radical having from 1 to 30 carbon atoms, a cycloaliphatic optionally double bond-containing hydrocarbon radical having from 5 to 40 carbon atoms, an aromatic hydrocarbon radical having from 6 to 40 carbon atoms or an alkylaryl radical having from 7 to 40 carbon atoms, $R^1$ and $R^2$ have the abovementioned meanings, X is an oxygen atom, a sulphur atom or a substituted nitrogen atom $NR^{1a}$ $R^{1a}$ is hydrogen, a linear or branched optionally double bond-containing aliphatic hydrocarbon radical having from 1 to 30 carbon atoms, an optionally double bond-containing cycloaliphatic hydrocarbon radical having from 5 to 40 carbon atoms, an aromatic hydrocarbon radical having from 6 to 40 carbon atoms, an alkylaryl radical having from 7 to 40 carbon atoms, a linear or branched optionally double bond-containing aliphatic hydrocarbon radical which has from 2 to 30 carbon atoms and is interrupted by one or more heteroatoms (oxygen, NH, NR' where R' is an optionally double bond-containing $C_1$-$C_{30}$-alkyl radical, in particular —CH₃, a linear or branched optionally double bond-containing aliphatic hydrocarbon radical which has from 2 to 30 carbon atoms and is interrupted by one or more functions selected from the group consisting of —O—C(O)—, —(O)C—O—, —NH—C(O)—, —(CH₃)N—C(O)—, —(O)C—N(CH₃)—, —S(O₂)—O—, —O—S(O₂)—, —S(O₂)—NH—, —NH—S(O₂)—, —S(O₂)—N(CH₃)—, —N(CH₃)—S(O₂)—, a linear or branched optionally double bond-containing aliphatic or cycloaliphatic hydrocarbon radical which has from 1 to 30 carbon atoms and is terminally functionalized by OH, OR', $NH_2$, N(H)R', $N(R')_2$ (where R' is an optionally double bond-containing $C_1$-$C_{30}$-alkyl radical) or a polyether $—(R^5—O)_n—R^6$ having a block or random structure.

Cyclic cations are based, for example, on the nitrogen compounds of the abovementioned type, e.g. pyrrolidine, dihydropyrrole, pyrrole, imidazoline, oxazoline, oxazole, thiazoline, thiazole, isoxazole, isothiazole, indole, carbazole, piperidine, pyridine, the isomeric picolines and lutidines, quinoline and isoquinoline. The cyclic nitrogen compounds of the general formulae (5), (6) and (7) can be unsubstituted (R=H), monosubstituted or polysubstituted by the radical R, where in the case of polysubstitution by R the individual radicals R can be different.

Further possible cations are ions which are derived from saturated acyclic, saturated or unsaturated cyclic compounds and also from aromatic compounds having in each case more than one trivalent nitrogen atom in a 4- to 10-membered, preferably 5- or 6-membered, heterocyclic ring. These compounds can be substituted both on the carbon atoms and on the nitrogen atoms. They can also be fused with optionally substituted benzene rings and/or cyclohexane rings to form polycyclic structures. Examples of such compounds are pyrazole, 3,5-dimethylpyrazole, imidazole, benzimidazole, N-methylimidazole, dihydropyrazole, pyrazolidine, pyridazine, pyrimidine, pyrazine, pyridazine, pyrimidine, 2,3-, 2,5- and 2,6-dimethylpyrazine, cinnoline, phthalazine, quinazoline, phenazine and piperazine. Cations of the general formula (8) derived from imidazole and its alkyl and phenyl derivatives have been found to be particularly useful as constituents of the salts having nonmetallic cations.

Further possible cations are ions which contain two nitrogen atoms and are represented by the general formula (8)

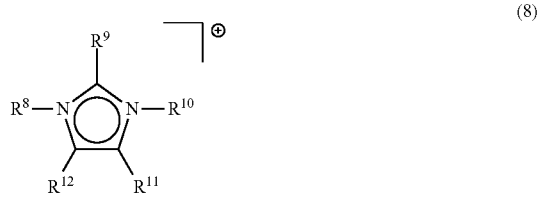

(8)

where $R^8, R^9, R^{10}, R^{11}, R^{12}$ are identical or different and are each hydrogen, a linear or branched optionally double bond-containing aliphatic hydrocarbon radical having from 1 to 30, preferably from 1 to 8, in particular from 1 to 4, carbon atoms, a cycloaliphatic optionally double bond-containing hydrocarbon radical having from 5 to 40 carbon atoms, an aromatic hydrocarbon radical having from 6 to 40 carbon atoms, an alkylaryl radical having from 7 to 40 carbon atoms, a linear or branched optionally double bond-containing aliphatic hydrocarbon radical which has from 1 to 30 carbon atoms and is interrupted by one or more heteroatoms (oxygen, NH, NR' where R' is an optionally double bond-containing $C_1$-$C_{30}$-alkyl radical), a linear or branched optionally double bond-containing aliphatic hydrocarbon radical which has from 1 to 30 carbon atoms and is interrupted by one or more functions selected from the group consisting of —O—C(O)—, —(O)C—O—, —NH—C(O)—, —(O)C—NH, —($CH_3$)N—C(O)—, —(O)C—N($CH_3$)—, —S($O_2$)—O—, —O—S($O_2$)—, —S($O_2$)—NH—, —NH—S($O_2$)—, —S($O_2$)—N($CH_3$)—, —N($CH_3$)—S($O_2$)—, a linear or branched optionally double bond-containing aliphatic or cycloaliphatic hydrocarbon radical which has from 1 to 30 carbon atoms and is terminally functionalized by OH, OR', $NH_2$, N(H)R', $N(R')_2$ where R' is an optionally double bond-containing $C_1$-$C_{10}$-alkyl radical, or a polyether $—(R^5—O)_n—R^6$ having a block or random structure, where $R^5$ is a hydrocarbon radical containing from 2 to 4 carbon atoms, n is from 1 to 100 and $R^6$ is hydrogen, a linear or branched optionally double bond-containing aliphatic hydrocarbon radical having from 1 to 30 carbon atoms, a cycloaliphatic optionally double bond-containing hydrocarbon radical having from 5 to 40 carbon atoms, an aromatic hydrocarbon radical having from 6 to 40 carbon atoms, an alkylaryl radical having from 7 to 40 carbon atoms or a radical $—C(O)—R^7$ where $R^7$ is a linear or branched optionally double bond-containing aliphatic hydrocarbon radical having from 1 to 30 carbon atoms, an optionally double bond-containing cycloaliphatic hydrocarbon radical having from 5 to 40 carbon atoms, an aromatic hydrocarbon radical having from 6 to 40 carbon atoms or an alkylaryl radical having from 7 to 40 carbon atoms.

Preference is given according to the invention to salts having a nonmetallic cation or mixtures thereof which are a combination of a 1,3-dialkylimidazolium, 1,2,3-trialkylimidazolium, 1,3-dialkylimidazolinium and/or 1,2,3-trialkylimidazolinium cation with an anion selected from the group consisting of halides, bis(trifluoromethylsulphonyl)imide, perfluoroalkyltosylates, alkylsulphates and alkylsulphonates, perfluorinated alkylsulphonates and alkylsulphates, perfluoroalkylcarboxylates, perchlorate, dicyanamide, thiocyanate, isothiocyanate, tetraphenylborate, tetrakis(pentafluorophenyl)borate, tetrafluoroborate and hexafluorophosphate. In addition, it is also possible to use simple, commercially available, acyclic quaternary ammonium salts such as ethylbis(polyethoxyethanol)(tallow alkyl)ammonium methylsulphate, methylbis(pentaethoxyethanol)coconutammonium methylsulphate, 1-butyl-3-methylimidazolium thiocyanate, 1-ethyl-3-methylimidazolium bromide, 1,3-dimethylimidazolium methylsulphate, 1-ethyl-3-methylimidazolium ethylsulphate, bis(2-hydroxyethyl)dimethylammonium methanesulphonate (products of Evonik Goldschmidt GmbH) or Rezol Heqams.

It has now surprisingly been found that specific ester- and amide-based dispersants (component (c)) do not display the disadvantages indicated and in thermogravimetric analysis (TGA) suffer a significantly lower weight loss than the typical waxes or stearates, which even at 280° C. is below 10%. Furthermore, they do not display any adverse effect on the surface quality and allow considerable amounts of carbon-based substrates to be introduced into both thermoplastic and thermoset polymers in order to produce antistatic or even conductive properties.

The dispersant of the component c) can, for example, be selected from among the following classes:

c1) polyacrylic esters, which can be prepared by esterification of an alkyl polyacrylate which can be obtained by polymerization and whose alkyl radicals have from 1 to 3 carbon atoms and which preferably has a molar mass of 1000-10 000 g/mol and particularly preferably 2000-5000 g/mol, with
a) saturated aliphatic alcohols having from 4 to 50 and preferably from 8 to 30 carbon atoms, and/or
b) unsaturated aliphatic alcohols having from 4 to 50 and preferably from 8 to carbon atoms,
where the molar ratio of the alcohol components a) and b) is from 1:0 to 0:1, preferably from 0.75:0.25 to 0.25:0.75 and particularly preferably from 0.6:0.4 to 0.4:0.6, and the components a) and/or b) are used in such amounts that from 30 to 100% and preferably from 70 to 100% of the ester groups are transesterified.

In a preferred embodiment, at least 25% of the ester groups are short-chain groups having from 1 to 4 carbon atoms in the alcohol part and at least 25%, particularly preferably at least 30% and in particular at least 40%, of the ester groups are long-chain groups having from 10 to 50 carbon atoms in the alcohol part. Preference is here given to lauryl radicals, oleyl radicals and stearyl radicals.

In addition to the alcohols mentioned, it is also possible, if desired, to make concomitant use of other alcohols in the transesterification, for instance polyacyalkylene monools and/or dialkylaminoalkanols as are described in EP 0 751 171 A2.

Suitable products are, for example, commercially available under the names TEGOMER®DA 100N and TEGOMER® DA 102 or in pulverulent form as TEGOMER® P121 (Evonik Goldschmidt GmbH).

c2) polyester-polyamine condensation products which can be obtained by partial or complete reaction of
A) one or more amino-functional polymers containing at least four amino groups with
B) one or more polyesters of the general formula (I) or (Ia)

T-C(O)—[O-A-C(O)]$_x$—OH  (I)

T-O—[C(O)-A-O-]$_y$—Z  (Ia)

and
C) one or more polyethers of the general formula (II) or (IIa)

T-C(O)—B—Z  (II)

T-O—B—Z  (IIa)

where
T is a hydrogen radical and/or an optionally substituted, linear or branched aryl, arylalkyl, alkyl or alkenyl radical having from 1 to 24 carbon atoms,
A is at least one divalent radical selected from the group consisting of linear, branched, cyclic and aromatic hydrocarbons,
Z is at least one radical selected from the group consisting of sulphonic adds, sulphuric adds, phosphonic acids, phosphoric acids, carboxylic acids, isocyanates, epoxides, in particular phosphoric acid and (meth)acrylic acid,
B is a radical of the general formula (III)

—(C$_l$H$_{2l}$O)$_a$—(C$_m$H$_{2m}$O)$_b$—(C$_n$H$_{2n}$O)$_c$—(SO)$_d$  (III)

SO=—CH$_2$CH(Ph)-O— where Ph=phenyl radical,
a, b, c are each, independently of one another, from 0 to 100,
with the proviso that the sum a+b+c is ≥0, preferably from 5 to 35, in particular from 10 to 20, with the proviso that the sum a+b+c+d is >0,
d is ≥0, preferably from 1 to 5,
l, m, n are each, independently of one another, ≥2, preferably from 2 to 4,
x, y are each, independently of one another, ≥2.

The reaction products can be present in the form of the amides and/or the corresponding salts. If the molecule part "Z" has a multiple bond, as can be the case, for example, in the polyethers and the alcohol-initiated polyesters in which the terminal OH group has been esterified with an unsaturated acid such as (meth)acrylic acid bonding is via a Michael addition of the NH function onto the double bond.

Examples of amino-functional polymers are amino-functional polyamino acids such as polylysine from Aldrich Chemical Co.; amino-functional silicones which can be obtained under the trade name Tegomer®ASi 2122 from Evonik Degussa GmbH; polyanidoamines which can be obtained under the trade names Polypox®, Aradur® or "Starburst®" as dendrimers from Aldrich Chemical Co.; polyallylamines and poly(N-alkyl)allylamines which can be obtained under the trade name PAA from Nitto Boseki; polyvinylamines which can be obtained under the trade name Lupamin® from BASF AG; polyalkyleneimines, for example polyethyleneimines which can be obtained under the trade names Epomin® (Nippon Shokubai Co., Ltd.), Lupasol® (BASF AG); polypropyleneimines which can be obtained under the trade name Astramol® from DSM AG. Further examples of amino-functional polymers are the abovementioned systems crosslinked by means of amine-reactive groups. This linking reaction is, for example, carried out by means of polyfunctional isocyanates, carboxylic acids, (meth)acrylates and epoxides. Further examples are poly(meth)acrylate polymers comprising dimethylaminopropyl(meth)acrylamide (Evonik Degussa GmbH) or dimethylaminoethyl (meth)acrylate (Evonik Degussa GmbH) as monomers.

It will be known to a person skilled in the art that other amino-functional polymers are also possible; these can likewise be used.

Amino-functional polymers having a molecular weight of from 400 g/mol to 600 000 g/mol are typically employed.

Examples of the radical T are alkyl radicals having from 1 to 24 carbon atoms, e.g. the methyl, ethyl, propyl, isopropyl, butyl, isobutyl, tert-butyl, hexyl, isohexyl, octyl, nonyl, isononyl, decyl, dodecyl, hexadecyl and octadecyl radicals. Examples of optionally substituted aryl or arylalkyl radicals having up to 24 carbon atoms are the phenyl, benzyl, tolyl and phenethyl radicals.

The polyester groups —[O-A-C(O)]$_x$— and —[C(O)-A-O-]$_y$— contain an average of more than two ester groups and have an average molecular weight M$_n$ of from 100 to 5000 g/mol. Particular preference is given to M$_n$=200 to 2000 g/mol.

A particularly preferred embodiment of the present invention is characterized in that the polyester group is obtained by processes known per se by means of ring-opening polymerization using a starter molecule such as T-CH$_2$—OH or T-COOH and one or more lactones, for example β-propiolactone, β-butyrolactone, γ-butyrolactone, 3,6-dimethyl-1,4-dioxane-2,5-dione, δ-valerolactone, γ-valerolactone, ε-caprolactone, γ-caprolactone, 4-methylcaprolactone, 2-methylcaprolactone, 5-hydroxydodecanoic lactone, 12-hydroxydodecanoic lactone, 12-hydroxy-9-octadecenoic acid, 12-hydroxyoctadecanoic acid.

Starter molecules such as T-COOH, and also the fatty alcohols T-CH$_2$—OH which can be prepared therefrom, are preferably the monobasic fatty acids based on natural vegetable or animal fats and oils having from 6 to 24 carbon atoms, in particular from 12 to 18 carbon atoms, which are known and customary in this field for example caproic acid, caprylic acid, capric acid, lauric acid, myristic acid, palmitic acid, palmitoleic acid, isostearic acid, stearic acid, oleic acid, linoleic acid, petroselic acid, elaidic acid, arachic acid, behenic acid, erucic acid, gadoleic acid, rapeseed oil fatty acid, soybean oil fatty acid, sunflower oil fatty acid, tall oil fatty acid, which can be used either alone or in admixture in the form of their glycerides, methyl or ethyl esters or as free acids, and also the industrial mixtures obtained in pressure dissociation. All fatty acids having a similar chain distribution are suitable in principle.

The content of unsaturated material in these fatty acids or fatty acid esters is, insofar as necessary, set to the desired iodine number by means of known catalytic hydrogenation processes or achieved by blending of fully hydrogenated fat components with unhydrogenated fat components.

The iodine number, as a measure of the average degree of saturation of fatty acid, is the amount of iodine taken up by 100 g of the compound to react with the double bonds.

Both the fatty acids and the resulting alcohols can be modified by molecular addition of alkylene oxides, in particular ethylene oxide and/or styrene oxide.

Examples of polyether building blocks of C are alkylene oxides such as: ethylene oxide, propylene oxide, butylene oxide, styrene oxide, dodecene oxide, tetradecene oxide, 2,3-dimethyloxirane, cyclopentene oxide, 1,2-epoxypentane, 2-isopropyloxirane, glycidyl methyl ester, glycidyl isopropyl ester, epichlorohydrin, 3-methoxy-2,2-dimethyloxirane, 8-oxabicyclo[5.1.0]octane, 2-pentyloxirane, 2-methyl-3-phenyloxirane, 2,3-epoxypropylbenzene, 2-(4-fluorophenyl)oxirane, tetrahydrofuran and their pure enantiomer pairs or enantiomer mixtures.

The group Z can be made up of addition products of carboxylic anhydrides such as succinic anhydride, maleic anhydride or phthalic anhydride.

The weight ratio of polyester to polyether in the dispersing resin according to the invention is in the range from 50:1 to 1:9, preferably from 40:1 to 1:5 and particularly preferably from 30:1 to 1:1.

A suitable polyester-polyamine condensation product is, for example, commercially available under the name TEGOMER®DA 626 (Evonik Goldschmidt GmbH).

The liquid dispersants are either employed for thermoset applications in combination with liquid salts having a nonmetallic cation or they can also be added in thermoplastic applications by introduction into the premix or by introduction in liquid form into the first third of the extrusion section. The liquid mixtures claimed according to the invention are optionally initially placed in a heatable pump having heatable feed lines in order to guarantee easy pumpability.

For the purposes of the invention, any carbon black can in principle be used as component d); however, preference is given to using a conductive carbon black. In conductive carbon blacks used according to the invention, the primary particle size is in the range from 0.005 to 0.2 µm, preferably from 0.01 to 0.1 µm. The dibutyl phthalate adsorption of the conductive carbon blacks is in the range from 40 to 1000 ml per 100 g of carbon black, preferably from 90 to 600 ml per 100 g of carbon black. Many oxygen-containing groups, for example carboxyl, lactol, phenol groups, quinoide carbonyl groups and/or pyrone structures, can be present on the surface of the carbon black.

Conductive carbon blacks can be produced, for example, from acetylene, from synthesis gas or by the furnace process from oil, carrier gases and air. Production processes and properties are described, for example, in R. G. Gilg, "Ruß für leitfähige Kunststoffe" in: Elektrisch leitende Kunststoffe, editor: H. J. Mair, S. Roth, $2^{nd}$ edition, Carl Hanser Verlag, 1989, Munich, Vienna, pp. 21-36.

According to the invention, graphite powder is comminuted graphite. To a person skilled in the art, graphite is modification of carbon as described, for example, in A. F. Hollemann, E. Wieberg, N. Wieberg, "Lehrbuch der anorganischen Chemie", $91^{st}$-$100^{th}$ edition, pp. 701-702. Graphite consists of planar carbon layers which are arranged above one another.

Graphite can, according to the invention, be comminuted by, for example milling. The particle size is in the range from 0.01 µm to 1 mm, preferably in the range from 1 to 300 µm, most preferably in the range from 2 to 20 µm.

Many types of carbon fibres are commercially available. They are produced from organic starting materials. Possible compounds are first and foremost those which can firstly be converted into an infusible intermediate and can subsequently be carbonized to form carbon with retention of shape in a pyrrolysis process, for example cellulose, polyacrylonitrile or pitch. In the carbonization treatment, all elements except for the major part of the carbon are eliminated in gaseous form. The relative proportion of carbon increases with increasing temperature, which is usually in the range from 1300-1500° C. According to manufacturer's data, a carbon content of from 90 to 99 percent by weight is achieved in this way. Above 1800° C., the process is known as graphitization. Here, in particular, the structure of the graphitic carbon layers is increasingly perfected. However, the distance between the planes of these carbon layers remains above the value known for actual graphite. Such "graphite fibres" are likewise suitable for the purposes of the invention.

Typical carbon fibres generally have a diameter in the order of from about 5 to 8 µm.

Preferred carbon nanotubes typically have the form of tubes formed by graphite layers. The graphite layers are arranged in a concentric fashion around the axis of the cylinder. Carbon nanotubes are also referred to as carbon nanofibrils. They have a length-to-diameter ratio of at least 5, preferably at least 100, particularly preferably at least 1000. The diameter of the nanofibrils is typically in the range from 0.003 to 0.5 µm, preferably in the range from 0.005 to 0.08 µm, particularly preferably in the range from 0.006 to 0.05 µm. The length of carbon nanofibrils is typically from 0.5 to 1000 µm, preferably 0.8 to 100 µm, particularly preferably from 1 to 10 µm. The carbon nanofibrils have a hollow, cylindrical core. This hollow space typically has a diameter of from 0.001 to 0.1 µm, preferably a diameter of from 0.008 to 0.015 µm. In a typical embodiment of the carbon nanotubes, the wall of the fibrils around the hollow space consists of, for example, 8 graphite layers. The carbon nanofibrils can be present as agglomerates which are made up of a plurality of nanofibrils and have a diameter of up to 1000 µm. The agglomerates can be in the form of birds' nests, combed yarn or open network structures. The synthesis of the carbon nanotubes is, for example, carried out in a reactor containing a carbon-containing gas and a metal catalyst, as described, for example in U.S. Pat. No. 5,643, 502.

Apart from multiwalled carbon nanotubes (MWCNTs), single-walled carbon nanotubes (SWCNTs) can also be used according to the invention. SWCNTs typically have a diameter in the range of a few nanometers, but attain considerable lengths relative to their cross section, typically lengths in the region of a plurality of microns. The structure of SWCNTs is derived from monoatomic graphite layers (graphene) which can be thought of as rolled up to form a seamless cylinder. SWCNTs can be excellent electric conductors. The achievable current densities of $10^9$ A/cm$^2$ are about 1000 times that of metal wires composed of copper or silver. The production of SWCNTs is described, for example, in U.S. Pat. No. 5,424,054.

Graphene is the term for a modification of carbon having a two-dimensional structure in which each carbon atom is surrounded by three further carbon atoms so as to form a honeycomb-like pattern. Graphene is closely related structurally to graphite which can be thought of as a plurality of superposed graphenes. Graphene can be obtained in relatively large quantities by exfoliation of graphite (splitting into the basal planes). For this purpose, oxygen is intercalated into the graphite lattice, and this then reacts partially with the carbon and brings about intrinsic repulsion of the layers. After chemical reduction, the graphenes can, in further steps, be suspended in solutions and embedded in polymers.

The metal salts which are optionally used concomitantly as component e) are simple or complex compounds which have alkaline earth metal or alkali metal and/or zinc cations as cation and as anion contain, for example, anions selected from the group consisting of bis(perfluoroalkylsulphonyl) amide and bis(perfluoroalkylsulphonyl)imide, e.g. bis(trifluoromethylsulphonyl)imide, alkyltosylates and aryltosylates, perfluoroalkyltosylates, nitrate, sulphate, hydrogensulphate, alkylsulphates and arylsulphates, polyether sulphates and polyether sulphonates, perfluoroalkylsulphates, alkylsulphonates and arylsulphonates, perfluorinated alkylsulphonates and arylsulphonates, alkylcarboxylates and arylcarboxylates, perfluoroalkylcarboxylates, perchlorate, tetrachloroaluminate, saccharinate and preferably thiocyanate, isothiocyanate, dicyanamide, tetraphenylborate, tetrakis(pentafluorophenyl)borate, tetrafluoroborate, hexafluorophosphate, phosphate and polyether phosphates, where the charges balance within the anion-cation combinations and mixtures of different salts can also be used. As alkali metal cation of the metal salt, preference is given to the sodium, potassium, lithium or caesium cation.

Preferred mixtures are, in particular, those containing NaSCN or NaN(CN)$_2$ and/or KPF$_6$ as alkali metal salt and an imidazolinium or imidazolium salt, preferably 1-ethyl-3-methylimidazolium ethylsulphate (EMIM ES), as salt having a nonmetallic cation. A suitable material which contains exclusively a salt having a nonmetallic cation is TEGO IL EMIM ES (Evonik Goldschmidt GmbH).

Apart from the constituents a) to e), the moulding composition can additionally contain auxiliaries or additives, which can be present in various percentages, required for setting particular properties. Examples are impact-modifying rubbers, further polymers such as polyphenylene ether, ABS or polyolefins, plasticizers, dyes, pigments and fillers such as titanium dioxide, zinc sulphide, silicates or carbonates, flame retardants, processing aids such as waxes, zinc stearate or calcium stearate, mould release agents, glass spheres, glass fibres, antioxidants, UV absorbers, HALSs or antidrip agents.

In a possible embodiment, the polymer composition contains from 1 to 25% by weight of plasticizers, particularly preferably from 2 to 20% by weight and in particular from 3 to 15% by weight.

Plasticizers and their use in the field of polymers are known. A general overview of plasticizers which are suitable for polymers may be found in Gächter/Müller, Kunststoffadditive, C. Hanser Verlag, 3$^{rd}$ edition, pp. 327-422.

Customary compounds suitable as plasticizers are, for example, esters of p-hydroxybenzoic acid having from 2 to 20 carbon atoms in the alcohol component or amides of arylsulphonic acids having from 2 to 12 carbon atoms in the amine component, preferably amides of benzenesulphonic acid.

Possible plasticizers are, inter alia, ethyl p-hydroxybenzoate, octyl p-hydroxybenzoate, i-hexadecyl p-hydroxybenzoate, N-n-octyltoluenesulphonamide, N-n-butylbenzenesulphonamide or N-2-ethylhexylbenzenesulphonamide.

The polymer composition of the invention is preferably produced from the individual constituents by melt-mixing in a kneading apparatus.

The components b) and c) can be added directly, either individually or together as a mixture, to the pelletized material, the polymer melt or the melt of all other components. For example, they can be metered as liquid by means of an optionally heated pump via optionally heated feed lines in the 1$^{st}$ third of the extrusion section. However, they can also be added, either individually or together as a mixture, in the form of a masterbatch. Such a masterbatch can contain from about to about 70% by weight of these components. The remainder of the masterbatch usually consists of the polymer used, as is also used as component a), or of a polymer which is compatible with the polymer of component a). Mixing is preferably carried out at elevated temperature in order to ensure improved pumpability.

The polyamide composition of the invention is preferably a polyamide moulding composition. However, it can also be a powder which is employed, for example, for surface coatings or for layer-by-layer buildup processes, for instance in rapid prototyping, for example using laser sintering.

Mouldings can be produced from the polymer composition or moulding composition of the invention and processed further by all conventional methods of the prior art, for example by extrusion, coextrusion, blow moulding or injection moulding. Here, the term "moulding" also encompasses sheet-like bodies such as films or plates. The mouldings obtained are likewise provided by the invention.

It has surprisingly been found that the electrical dissipative or antielectrostatic effect or the electrical conductivity brought about by the component d) is improved further by addition of components b) and c). Here, a synergistic effect is found when b) and c) are simultaneously present. If b) is also present, the amount of c) required to achieve a particular conductivity level is only half as much as when c) alone is present. As a result of the improvement in the percolation behaviour, only a smaller total amount of the component d) is required; this is particularly advantageous when using CNTs or graphene, which are very expensive.

As a result of better dispersing and the possible reduction in the concentration of the component d), the polymer composition has an improved surface quality, which can be determined by means of a microscope or better by measurement of the coefficient of friction or the gloss.

The invention further provides a process for producing high-loading (from >20% by weight to 70% by weight) masterbatches of the abovementioned liquid or solid dispersants and the abovementioned salts having a nonmetallic cation or mixtures thereof.

The mouldings made of the polymer composition of the invention are widely used where good conductivity properties combined with good mechanical properties are demanded, for example in the industrial sectors of automobiles, aircraft and electronics and also in communications technology, safety technology and lightweight construction technology. Examples of applications are instrument switches for explosion-protected rooms, antistatic housings, fuel filters and plug connectors.

Furthermore, it has surprisingly been found that the content of styrene, which is hazardous to health, in unsaturated polyester resins can be reduced by at least 10% while achieving an equally good or better antistatic or conductive effect when dispersants claimed according to the invention or combinations thereof with liquid salts having a nonmetallic cation are used.

Furthermore, it has surprisingly been found that the conductive carbon blacks, carbon fibres, graphene or CNTs together with the dispersant and at least one salt having a nonmetallic cation give an improved antistatic effect or increased conductivity even without dissolved metal salts.

The invention therefore provides for the use of conductive carbon blacks, carbon fibres, graphene or CNTs together with the dispersant and at least one salt having a nonmetallic cation as antistatic or conductivity improver for plastics, in particular for polyolefins and polyamide 6 and 6.6 and also for UPES.

The invention further provides polymer compositions comprising conductive carbon black and/or carbon fibres, graphene and/or CNTs together with a dispersant and at least one salt having a nonmetallic cation and optionally also metal salts.

Polymer Composition

A further aspect of the invention is that the polymer compositions claimed according to the invention have an equally good or improved notched impact toughness measured by the IZOD method. This is not restricted to but is particularly evident in the case of polyamide 6 or 6.6.

The invention therefore further provides the process for producing polymer compositions or polymer compounds (the term is here used synonymously with polymer composition) which have been made antistatic or conductive, where, for the purposes of the patent application, antistatic means a specific volume resistance in accordance with IEC 60093 of greater than $10^9$ Ωm (ohm*m), preferably $10^{12}$-$10^9$ ohm*m, and conductive means a volume resistance of less than $10^9$ ohm*m, preferably $10^7$-$10^3$ ohm*m and particularly preferably $10^5$-$10^{-1}$ ohm*m, for the purposes of the patent application. In the production process, a distinction is made in respect of the component (d) used as carbon basis in the composition of the polymer compound:

d1) conductive carbon blacks or carbon fibres or graphite or d2) CNTs or graphene or d3) any mixtures of a) and b).

Case d1)

A specific volume resistance in accordance with IEC 60093 of not more than $10^9$ ohm*m, preferably from $10^8$ to $10^6$ ohm*m is preferably achieved for polymer compositions containing from 0 to 15% by weight of at least one salt having a nonmetallic cation, from 0 to 5% by weight of at least one metal salt, from 1 to 25% by weight of at least one dispersant, from 15 to 25% by weight of at least one conductive carbon black or carbon fibres or graphite and optionally from 0 to 5% by weight of further additives, where the balance to 100% by weight is made up by the respective thermoset or thermoplastic polymer. Particular preference is given to compositions in which from 2.5 to 10% by weight of at least one salt having a nonmetallic cation, from 0 to 2% by weight of at least one metal salt, from 2.5 to 15% by weight of at least one dispersant and from 15 to 25% by weight of a conductive carbon black are employed; or Case d2)

A specific volume resistance of $10^8$-$10^6$ ohm*m is preferably achieved when CNTs or graphene are either dispersed directly in relatively low concentrations in the polymer composition or the following composition can be produced from a CNT masterbatch by backdiluting with the appropriate polymer to a use concentration of the CNTs of 2-8% by weight, where the polymer compositions comprise 0-15% by weight of at least one salt having a nonmetallic cation, 0-5% by weight of at least one metal salt, 1-20% by weight of at least one dispersant, 1-20% by weight of one or more CNTs and optionally 0-5% by weight of further additives, where the balance to 100% by weight is made up by the respective thermoset or thermoplastic polymer. Particular preference is given to compositions in which 1.0-8.0% by weight of at least one salt having a nonmetallic cation, 0-2% by weight of at least one metal salt, 1.0-8.0% by weight of at least one dispersant and 1.0-8.0% by weight of one or more CNTs are employed; or Case d3) is any Mixtures of a) and b), where a Specific Volume Resistance of Not More than $10^9$ Ohm*m is Achieved.

The polymer compositions which can be used according to the invention are thermoplastics or thermosets which can be in the form of homopolymers or copolymers, have thermoplastic or thermoset properties and can have noncrystalline, partially crystalline or crystalline regions. Preference is given to polyolefins such as low density and high density polyethylene, polypropylene, polystyrene, vinyl polymers and also engineering polymers such as specific polyamide 6 or 6.6, polyesters, polyacetals, polycarbonates or polyvinyl chlorides, polyurethanes, polyethers and also copolymers thereof or mixtures thereof in any proportions by mass.

The invention further provides a process in which CNTs are not produced directly in the ready-to-use concentration of the article to be injection moulded, which is typically in the range from 2 to 8% by weight, depending on the polymer composition used, but the CNTs are instead predispersed in a masterbatch process (concentration of the CNTs in the masterbatch can be up to 20%) and then backdiluted to the use concentration.

The invention further provides conductive polymer compositions containing at least 5% of CNTs.

A volume resistance of $10^6$-$10^4$ ohm*m is preferably achieved for polymer compositions containing 0-10% by weight of a salt having a nonmetallic cation, 0-5% by weight of metal salt, 1-10% by weight of dispersant, 2-10% by weight of a CNT and optionally 0-5% by weight of further additives, where the balance to 100% by weight is made up by the respective thermoset or thermoplastic polymer.

Further subjects of the invention are characterized by the claims that articles and applications which have such a low surface and/or volume resistance when produced by injection moulding and do not have to be produced only by pressing can be realised by means of the abovementioned polymer compositions. That is to say, the injection moulding of thermoplastic components, which is relevant for industrial practice, is achievable and the anisotropy effect which is suppressed in the case of pressing can be reduced significantly by the use according to the invention of the abovementioned dispersants, optionally in combination with salts having a nonmetallic cation, which can be seen from the improved antistatic or conductivity values. This is all the more surprising since, in injection moulding, the network of the fractal carbon-based constituents is extremely disrupted and made unstable by the temperature used and first and foremost by the directed pressure on opening the injection moulding tool or its nozzle in order to produce a plate, a moulding in the form of a shoulder bar or an electronic component or an automobile part. In the subsequent very rapid cooling process, where short cycle times are necessary for a high output of parts, the viscosity of the basic thermoplastic matrix increases within seconds and barely allows time for fresh orientation of the polymer network and the carbon-based components present therein.

The premixing of the components is, however, particularly preferably not restricted to the case of thermoplastic polymer compositions which are manufactured by means of extrusion/compounding. The addition positions of components are restricted or would in practice result in extremely expensive embodiments of the metered additions in the form of installations on the extrusion section, which would possibly destroy the savings potentials by reduced use of, for example, expensive CNTs.

A preferred process according to the invention is accordingly based on the use of conductive carbon blacks, carbon fibres, graphene and/or CNTs with at least one salt having a nonmetallic cation together with at least one dispersant (compatibilizer) and optionally a metal salt, in particular alkali metal salts, dispersed in plastics. The invention also provides a process for producing masterbatches of the polymer compositions, in which from 20% by weight to 70% by weight of the dispersants and optionally the above-mentioned metal salts, based on the total polymer composition, are used.

Further subjects of the invention may be derived from the claims, whose disclosure content is in its full scope part of the present description.

The examples described below illustrate the present invention without the invention, whose scope is given by the entire description and the claims, being restricted to the embodiments mentioned in the examples. Where ranges, general formulae or classes of compounds are indicated below, these encompass not only the corresponding ranges or groups of compounds which are explicitly mentioned but also all subranges and subgroups of compounds which can be obtained by leaving out individual values (ranges) or compounds. If documents are cited in the present description, the content thereof is fully incorporated by reference into the disclosure content of the present invention. If compounds which can have the various monomer units a plurality of times are described in the context of the present invention, these monomer units can occur randomly distributed (random oligomer) or in an ordered fashion (block oligomer) in these compounds. Indications of the number of units in such compounds are statistical averages over all corresponding compounds.

Example

Production of the Polymer Compositions

Thermoplastic polymer compositions were made either using a Leistritz 27 mm, 39L/D or, when PA 6.6 and liquid additives or additive mixtures (dispersant and/or salt having a nonmetallic cation) were used, using a Leistritz 27MAXX, 44L/D. The carbon-based products (component d)) were introduced via a separate inlet in the first third of the screw length. The temperature profile utilized in these extrusion zones is the recommendation of the manufacturer of the respective thermoplastic taken from the technical data sheet. Individual components were predried where appropriate. The polymer compositions were processed on the above-mentioned machines using a machine throughput of 3-10 kg as a function of the degree of fill and polymer.

The thermoset polymer compositions were made in a 1 liter batch in a 2 liter coolable double-walled vessel using a high-speed stirrer from Getzmann (Germany). For the critical experiments, milling was carried out using beads having a size of 1.6-2.1 mm and a Teflon double disc was employed. However, for preliminary experiments, a normal 8 cm toothed disc made of metal was employed. The important thing is that the dispersants claimed according to the invention and/or salts having a nonmetallic cation and/or the metal salt are introduced into and homogenized in the liquid thermoset mixture; a clear or non-separating composition is not automatically obtained and the carbon-based additives are only added then. This also brings the advantage that the addition can be stopped at the right time or continued when relatively high degrees of fill are made possible by the compositions claimed according to the invention, as has been observed, for example, when styrene is partially left out in unsaturated polyesters.

Measurement of the Surface Resistance and Volume Resistance

All test specimens (for production of the plates, see description below) were stored under standard conditions of temperature and humidity (23° C., 50% atmospheric humidity). 72 hours after production, the test specimens were examined to determine their surface resistance by means of a resistance measuring instrument (high-ohm-measuring instrument HM 307 from Fetronic GmbH). For this purpose, a DC voltage of 1 V, 10 V, 100 V or 500 V was applied, with the measurement at 100 V having been found to be particularly relevant for the test specimens having a layer thickness of 2-4 mm. The surface resistance of the test specimen was in each case measured three times on the upper side and three times on the underside. The mean of these values was formed. The values measured and read off directly on the instrument were reported in ohm [$\Omega$]. A round electrode was used for the measurements and care was taken to ensure establishment of a constant value. It should be noted that the sample does not warm up, which is, however, not relevant in the case of the low applied voltages for 2-4 mm thick parts, but frequently occurs only on relatively thin substrates such as films. The blank (test specimen composed of a polymer composition which is not according to the invention) was in each case remeasured before an associated series of measurements in order to avoid or be able to evaluate influences of a slight fluctuation in the surroundings.

The surface resistance can thus be read off directly and is determined only by the geometry of the round electrode representing the two electrode parts between which the current flows. On the other hand, the volume resistance has to be calculated since it additionally has to take account of the plate thickness; it is reported with the unit ohm [$\Omega$]*length.

Measurement of the Coefficient of Friction (COF)

The measurement of the coefficient of friction is carried out in accordance with DIN EN ISO 8295; the principle is illustrated by FIG. 1. A 1000 g test weight having a diameter of 4 cm is drawn at a speed of 10 mm/min over the surface of the respective plates of the polymer compositions. A dimensionless coefficient of friction can then be read off or a force in Newton can be calculated from the diameter and weight of the moving cylinder. Three specimens from each polymer composition are always employed and the mean thereof is formed. If the force is at least 2 newton lower than for the specimen which does not have the constitution according to the invention, a better surface quality can be deduced.

Measurement Of the Gloss

The measurement of the gloss was carried out on a representative plate produced by injection moulding or by curing of a thermoset in a casting mould; the measurement was carried out at at least three points and the mean thereof was formed. The measurement of the gloss was carried out using the DATACOLOR or Byk Gardner instrument (both manufacturers in Germany) in accordance with the DIN EN ISO standards 2813 and 5033, since it is carried out in parallel with the colour measurement. The measurement was carried out at 20° and 60° gloss. If the gloss of the polymer compositions claimed according to the invention is 5 units higher in at least one of the gloss categories, a significant improvement in the surface quality can be deduced.

Measurement Of the Impact Toughness (IT) and the Notched Impact Toughness (NIT)

The measurement of the two parameters for determining IT and/or NIT is carried out on the test specimens in the form of shoulder bars produced by means of injection moulding in the case of the thermoplastics and on such bars produced by means of casting and curing in the case of the thermoset polymer compositions. For the determination of a value, 10 shoulder bars per composition are measured and a mean is formed for at least 8 of the specimens since the highest and lowest value are optionally not employed for the measurement. If the specimens have voids or holes in the region of the fracture after carrying out the test, this value must likewise not be employed and more than 10 shoulder bars may in this case have to be measured. The method is carried out in accordance with DIN EN ISO 180, using a 1 joule hammer for the IT and a 4 joule hammer in the case of the NIT. In addition, in the case of the NIT, a notch having a radius of 0.25 mm is cut on the 80 mm middle part of the 4 mm thick shoulder bar. The resulting values of IT and NIT are in $kJ/m^2$ since the measured energy read off on the instrument is reduced by the air resistance and this value is subsequently divided by the product of thickness and width.

As is known to those skilled in the art, it is not possible to determine the IT for each polymer composition, but the NIT is measured instead, e.g. in the case of PA 6.

Manufacture of the Test Specimens for the Determination of the Mechanical Properties, in Particular the Impact Toughness (IT) and Notched Impact Toughness (NIT) in the Form of Shoulder Bars.

The shoulder bars are, in accordance with the requirements for the determination to be carried out subsequently in accordance with DIN EN ISO 180, injection-moulded on an injection-moulding machine from Engel (Germany) using the respective thermoplastic polymer composition at the temperature predetermined by the polymer and prescribed on the technical data sheet (TDS) for this and stored under standard conditions of temperature and humidity for 48 hours.

In the case of thermoset polymer compositions, corresponding shoulder bars are cast and cured in accordance with the instructions using the initiators as prescribed by, for example, the manufacturers of the unsaturated polyester resins on the technical data sheets.

Manufacture of the Test Specimens for the Determination of the Coefficient of Friction (COF) in the Form of Plates which are Likewise Employed for the Determination of the Resistance Values.

In the case of the thermoplastic polymer compositions, 6 cm×6 cm plates having a thickness of 0.2 cm are injection-moulded on a machine from Engel (Germany), with the parameters for injection moulding being, as indicated above, determined by the polymer used on the TDS for this.

For the thermoset polymer compositions, plates are once again produced by casting and curing, with these plates having a width and length of 6 cm×12 cm and a thickness of 0.2 cm or 0.4 cm, which could also be employed for the thickness-dependent determination of the volume resistance.

Testing

In the following, the thermoplastic compositions based on polyamide 6 (PA 6) manufactured according to the invention are compared with comparative examples which do not have a surface or volume resistance according to the invention.

The polyamide compounds are manufactured according to the above description using a twin-screw extruder and have the constitution described in Tables 1a and 1b.

In the case of the liquid additives TEGOMER DA 100N and DA 626 used in the examples as claimed according to the invention, 50% strength masterbatches in polyamide 6 (PA 6) can firstly be produced. The liquid component B was metered directly into the polymer melt using a heatable pump.

The test specimens made had the dimensions 6 cm*6 cm and a thickness of 2 mm. The specimens did not heat up to above room temperature, which was also the measurement temperature, during the measurement.

The determination of the gloss values was carried out using a measurement instrument from Datacolor.

TABLE 1a

Compositions

| Component | a) Polymer Polyamide 6 | b) Salt having a nonmetallic cation TEGO IL EMIM ES | c) Dispersant TEGOMER P121 | d) Carbon component Electrovac HTF 110 FF | e) Metal salt NaN(CN)$_2$ |
|---|---|---|---|---|---|
| N 1 | 89.75 | 0 | 0.25 | 10.00 | — |
| N 2 | 85.00 | 0 | 5.00 | 10.00 | — |
| N 3 | 84.75 | 5.00 | 0.25 | 10.00 | — |
| E 1 (HW 1) | 79.50 | 5.00 | 5.00 | 10.00 | 0.50 |
| E 2 | 80.50 | 5.00 | 5.00 | 9.00 | 0.50 |
| E 3 (HW 2) | 79.50 | 5.00 | 5.00 | 10.00 | 0.50 |

HW 1 = direct dispersion of the CNTs with the other components in the polymer
HW 2 = 2-stage production, i.e. production of a 20% strength masterbatch of the CNTs in the polymer and subsequent backdilution with all other components to the final concentration of 10%

TABLE 1b

Further compositions, analogous to Table 1a

| a) Polyamide 6 | b) TEGO IL EMIM ES | c) P121 | c) DA 626 | c) DA 100N | d) Printex L6 | e) NaN(CN)2 |
|---|---|---|---|---|---|---|
| N4 | 80.00 | — | — | — | — | 15.00 | — |
| N5 | 70.00 | — | 10.00 | — | — | 15.00 | — |
| N6 | 75.00 | 5.00 | — | — | — | 15.00 | — |
| E4 | 65.00 | 5.00 | 10.00 | — | — | 15.00 | — |
| E5 | 71.00 | 5.00 | — | 3.00 | — | 15.00 | 1.0 |
| E6 | 68.00 | 7.00 | — | — | 5.00 | 15.00 | — |

As can be seen from Table 2, the use of component b) in the form of the salt having a nonmetallic cation in combination with the carbon component is just as unsatisfactory as the sole use of a dispersant c); instead, only the combination of b) and c) leads to a dispersed state with sufficient development of a percolation network which results in a polymer composition having a surface resistance in accordance with IEC 60167 of from $10^{-1}$ to $10^{10} \Omega$ and a specific volume resistance in accordance with IEC 60093.

It can be seen from Table 2 that the examples E 1 to E 6 according to the invention all lead to the reduction according to the invention in the surface and volume resistances.

The corresponding increasing gloss of the polymer compositions can clearly be seen and also enables visible parts which have antistatic or conductive characteristics and satisfy aesthetic demands to be produced. The gloss value of the 60° gloss of Example N 1 which is not according to the invention was set at 100% and the increase is reported as a percentages in Table 2; nd denotes values not measured/determined. The gloss values for the examples according to the invention exceed the significance value of 105% indicated above.

TABLE 2

Results, surface resistance $R_O$ [ohm], volume resistance $R_D$ [ohm * m] and gloss of the compositions as per Tables 1a and 1b

| Component | $R_O$ [Ohm] | $R_D$ [Ohm * m] | Gloss 60° [%] |
|---|---|---|---|
| N 1 | $4.5 \cdot 10^{14}$ | $8.3 \cdot 10^{13}$ | 100 |
| N 2 | $4.6 \cdot 10^{10}$ | $8.5 \cdot 10^{9}$ | nd |
| N 3 | $3.2 \cdot 10^{12}$ | $5.9 \cdot 10^{11}$ | nd |
| E 1 | $3.4 \cdot 10^{6}$ | $6.2 \cdot 10^{5}$ | 123 |
| E 2 | $7.8\ 10^{6}$ | $1.4\ 10^{5}$ | 116 |
| E 3 | $8.2 \cdot 10^{5}$ | $2.4 \cdot 10^{4}$ | nd |
| N 4 | $3.9 \cdot 10^{13}$ | $7.1 \cdot 10^{14}$ | 100 |
| N 5 | $5.5 \cdot 10^{9}$ | $1.0 \cdot 10^{11}$ | nd |
| N 6 | $2.7 \cdot 10^{10}$ | $4.9 \cdot 10^{12}$ | nd |
| E 4 | $6.6 \cdot 10^{5}$ | $1.2 \cdot 10^{7}$ | nd |
| E 5 | $5.6\ 10^{7}$ | nd | 119 |
| E 6 | $2.4\ 10^{5}$ | $5.1\ 10^{6}$ | nd |

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

The invention claimed is:

1. A polymer composition comprising the following components:
(a) at least 40 parts by weight of a polymer selected from the group of polymers consisting of:
(a1) thermoplastics; and
(a2) thermosets;
where the polymer is used alone, in a mixture of polymers, or as a copolymer;
with the proviso that the polymer (a) is not a polyamide whose monomer units have an arithmetic average of 7.5 carbon atoms or more;
(b) from 0.1 to 15 parts by weight of a salt having a nonmetallic cation that is a quaternary nitrogen or phosphorus compound;
(c) from 0.5 to 25 parts by weight of a dispersant based on esters or amides; and
(d) an electrically conductive carbon selected from the group consisting of carbon black, graphite powders, carbon fibres, carbon nanotubes, and graphene, in an amount which in the polymer composition gives a specific surface resistance in accordance with IEC 60167 of from $10^{-1}$ to $10^{10} \Omega$;
wherein a specific volume resistance, in accordance with ICE 60093, of the polymer composition is from $10^{-3}$ to $10^{7}$ $\Omega$m; and
wherein the dispersant of component (c) is selected from among the group consisting of:
(c1) polyacrylic esters, which are prepared by esterification of:
an alkyl polyacrylate which is obtained by polymerization and whose alkyl radicals have from 1 to 3 carbon atoms; with
a component selected from the group consisting of:
(c1-1) saturated aliphatic alcohols having from 4 to 50 carbon atoms; and
(c1-2) unsaturated aliphatic alcohols having from 4 to 50 carbon atoms;
where components (c1-1) and (c1-2) are used in such amounts that from 30 to 100% of the ester groups are transesterified; and
(c2) polyester-polyamine condensation products, which are obtained by partial or complete reaction of:
(c2-1) one or more amino-functional polymers containing at least four amino groups; with
(c2-2) one or more polyesters of the general formula (I) or (Ia):

  (I);

  (Ia); and (c2-3) one or more polyethers of the general formula (II) or (IIa):

  (II);

  (IIa);

where:
T is a hydrogen radical and/or an optionally substituted, linear or branched aryl, arylalkyl, alkyl, or alkenyl radical having from 1 to 24 carbon atoms;
A is at least one divalent radical selected from the group consisting of linear, branched, cyclic, and aromatic hydrocarbons;
Z is at least one radical selected from the group consisting of sulphonic acids, sulphuric acids, phosphonic acids, phosphoric acids, carboxylic acids, isocyanates, epoxides, in particular phosphoric acid, and (meth)acrylic acid;
B is a radical of the general formula (III):

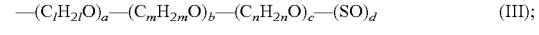  (III);

where:
SO=—$CH_2$—CH(Ph)-O— where Ph=phenyl radical;
b, and c are each, independently of one another, from 0 to 100;
with the proviso that the sum a+b+c is $\geq 0$;
d is $\geq 0$;
l, m, and n are each, independently of one another, $\geq 2$; and
x and y are each, independently of one another, $\geq 2$.

2. The polymer composition according to claim 1, further comprising:
(e) from greater than 0 to 5 parts by weight of a metal salt;

wherein component (b) is present in an amount of from 0.1 to 10 parts by weight;
wherein component (c) is present in an amount of from 1 to 10 parts by weight; and
wherein carbon nanotubes, as component (d), are present in an amount of from 1 to 10 parts by weight.

3. The polymer composition according to claim 1;
wherein the nonmetallic cation of the component (b) consists of at least one quaternary nitrogen cation of the general formulae:

  (1);

  (2);

  (3); or

  (4);

where:
$R^1$, $R^2$, $R^3$, and $R^4$ are identical or different, and are each:
hydrogen;
a linear or branched or double bond-containing aliphatic hydrocarbon radical having from 1 to 30 carbon atoms;
a saturated or unsaturated, optionally double bond-containing cycloaliphatic hydrocarbon radical having from 5 to 40 carbon atoms;
an aromatic hydrocarbon radical having from 6 to 40 carbon atoms;
an alkylaryl radical having from 7 to 40 carbon atoms;
a linear or branched, optionally unsaturated aliphatic hydrocarbon radical which has from 2 to 30 carbon atoms and is interrupted by a radical containing one or more heteroatoms;
—NH—;
—NR'—;
a linear or branched or double bond-containing aliphatic hydrocarbon radical which has from 2 to 30 carbon atoms and is interrupted by one or more functions selected from the group consisting of —O—C(O)—, —(O)C—O—, —NH—C(O)—, —(O)C—NH, —(CH$_3$)N—C(O)—, —(O)C—N(CH$_3$)—, —S(O$_2$)—O—, —O—S(O$_2$)—, —S(O$_2$)—NH—, —NH—S(O$_2$)—, —S(O$_2$)—N(CH$_3$)—, and —N(CH$_3$)—S(O$_2$)—;
a linear or branched or double bond-containing aliphatic or cycloaliphatic hydrocarbon radical which has from 1 to 30 carbon atoms and is terminally functionalized by —OH, —OR', —NH$_2$, —N(H)R', or —N(R')$_2$; or
a polyether —(R$^5$—O)$_n$—R$^6$ having a block or random structure;
where:
R' is a saturated or unsaturated C$_1$-C$_{30}$-alkyl radical;
$R^5$ is a linear or branched hydrocarbon radical containing from 2 to 4 carbon atoms;
n is from 1 to 100; and
$R^6$ is hydrogen, a linear or branched or double bond-containing aliphatic hydrocarbon radical having from 1 to 30 carbon atoms, a double bond-containing cycloaliphatic hydrocarbon radical having from 5 to 40 carbon atoms, an aromatic hydrocarbon radical having from 6 to 40 carbon atoms, an alkylaryl radical having from 7 to 40 carbon atoms, or a radical —C(O)—R$^7$, where:
$R^7$ is a linear or branched or double-bond-containing aliphatic hydrocarbon radical having from 1 to 30 carbon atoms, or a double-bond-containing cycloaliphatic hydrocarbon radical having from 5 to 40 carbon atoms, or an aromatic hydrocarbon radical having from 6 to 40 carbon atoms, or an alkylaryl radical having from 7 to 40 carbon atoms;
wherein an anion of the component (b) is selected from the group consisting of halides, carboxylates, phosphates, thiocyanates, isothiocyanates, dicyanamide, sulphates, hydrogensulphate, alkylsulphates and arylsulphates, polyether sulphates and polyether sulphonates, perfluoroalkylsulphates, sulphonate, alkylsulphonates and arylsulphonates, perfluorinated alkylsulphonates and arylsulphonates, sulphonates, tetrafluoroborates, hexafluorophosphates, bis(perfluoroalkylsulphonyl)amides or bis(perfluoroalkylsulphonyl) imides, bis(trifluoromethylsulphonyl)imide, alkyltosylates and aryltosylates, perfluoroalkyltosylates, nitrates, alkylcarboxylates and arylcarboxylates, perfluoroalkylcarboxylates, perchlorate, tetrachloroaluminate, saccharinate, dicyanamide, thiocyanate, isothiocyanate, tetraphenylborate, tetrakis(pentafluorophenyl)borate, tetrafluoroborate, hexafluorophosphate, polyether phosphates, and phosphate;
wherein the charges balance within the anion-cation combination of the component (b) salt; and
wherein the polymer composition optionally includes mixtures of different component (b) salts.

4. The polymer composition according to claim 1;
wherein the nonmetallic cation of the component (b) salt is selected from the group consisting of substituted ammonium, phosphonium, pyridinium, imidazolinium, and imidazolium cations;
wherein the charges within the anion-cation combination of the component (b) salt balance; and
wherein the polymer composition optionally includes mixtures of different component (b) salts.

5. The polymer composition according to claim 1;
wherein the dispersant of component (c) is selected from among (c1) polyacrylic esters whose alkyl radicals have from 1 to 3 carbon atoms, where at least 25% of the ester groups are short-chain groups having from 1 to 4 carbon atoms in the alkyl part, and at least 25% of the ester groups are long-chain groups having from 10 to 50 carbon atoms in the alcohol part.

6. The polymer composition according to claim 2;
wherein the metal salt of the component (e) has:
an anion selected from the group consisting of halides, carboxylates, phosphates, thiocyanates, isothiocyanates, dicyanamide, sulphates, hydrogensulphate, alkylsulphates and arylsulphates, polyether sulphates and polyether sulphonates, perfluoroalkylsulphates, sulphonate, alkylsulphonates and arylsulphonates, perfluorinated alkylsulphonates and arylsulphonates, sulphonates, tetrafluoroborates, hexafluorophosphates, bis(perfluoroalkylsulphonyl)amides or bis(perfluoroalkylsulphonyl)imides, bis(trifluoromethylsulphonyl)imide, alkyltosylates and aryltosylates, perfluoroalkyltosylates, nitrates, alkylcarboxylates and arylcarboxylates, perfluoroalkylcarboxylates, perchlorate, tetrachloroaluminate, saccharinate, dicyanamide, thiocyanate, isothiocyanate, tetraphenylborate, tetrakis(pentafluorophenyl)borate, tetrafluoroborate, hexafluorophosphate, polyether phosphates, and phosphate; and a cation selected from the group consisting of alkaline earth metals, alkali metals, and zinc;

wherein the charges within the anion-cation combination of the component (e) salt balance; and wherein the polymer composition optionally includes mixtures of different component (e) salts.

7. The polymer composition according to claim 1;
wherein the thermoplastics (a1) are selected from the group consisting of polyolefins, polypropylene and polyethylene, polystyrene, vinyl polymers, polyesters, polyether polyols, polyacetates, polyvinyl acetates, polyacetals, polycarbonates, thermoplastic polyurethanes, ionomers, thermoplastic elastomers, polyamides whose monomer units contain an average of less than 7.5 carbon atoms, polyphthalamides based on terephthalic acid and/or isophthalic acid, hexamethylenediamine, 2-methylpentanediamine, and thermoplastics which contain caprolactam or hexamethylenediamine/adipic acid or contain derivatives thereof as comonomers.

8. The polymer composition according to claim 1;
wherein the thermosets (a2) are selected from the group consisting of amorphous resins, diallyl phthalate resins (DAP), epoxy resins (EP), urea-formaldehyde resins (UF), melamine-formaldehyde resins (MF), melamine-phenol-formaldehyde resins (MPF), phenol-formaldehyde resins, and unsaturated polyester resins (UPES).

9. Moulding comprising:
the polymer composition according to claim 1.

10. A process for producing the polymer composition according to claim 1, comprising:
dispersing, in a plastic, conductive carbon blacks, carbon fibres, graphite, graphene, and/or carbon nanotubes, with at least one salt having a nonmetallic cation, together with at least one dispersant and optionally a metal salt.

11. The process according to claim 10;
wherein, in the case that component (a) is a thermoset polymer, the dispersant or dispersants are combined with liquid salts having a nonmetallic cation; and
wherein, in the case that component (a) is a thermoplastic polymer, the dispersant or dispersants are added by introduction of the dispersant into the premix or by introduction by means of metering of liquid in the first third of an extrusion section.

12. The process according to claim 10;
wherein the polymer composition is a masterbatch; and
wherein the masterbatch comprises from 20% by weight to 70% by weight of the dispersants, and optionally of the abovementioned metal salts, based on the total polymer composition.

13. The process according to claim 10;
wherein the electrically conductive carbon component (d) is selected from the group consisting of:
(d1) conductive carbon blacks, carbon fibres, and graphite;
(d2) CNTs and graphene;
(d3) mixtures of (d1) and (d2);
wherein, when component (d) is selected from the group (d1), a specific volume resistance in accordance with IEC 60093 of not more than $10^9$ Ωm is achieved when the polymer composition contains:
0-15% by weight of at least one salt having a nonmetallic cation;
0-5% by weight of at least one metal salt;
1-25% by weight of at least one dispersant;
15-25% by weight of at least the conductive carbon black or the carbon fibres or the graphite; and
optionally 0-5% by weight of further additives;
where the balance to 100% by weight is made up by the respective thermoset or thermoplastic polymer;
wherein, when component (d) is selected from the group (d2), a specific volume resistance in accordance with IEC 60093 of $10^8$-$10^6$ ohm*m is achieved when CNTs are either dispersed directly in relatively low concentrations in the polymer composition or a CNT masterbatch is produced and backdiluted with the corresponding polymer to a use concentration of the CNTs of 2-8% by weight and the polymer composition comprises:
0-15% by weight of at least one salt having a nonmetallic cation;
0-5% by weight of at least one metal salt;
1-20% by weight of at least one dispersant;
1-20% by weight of one or more CNTs or graphene; and
optionally 0-5% by weight of further additives;
where the balance to 100% by weight is made up by the respective thermoset or thermoplastic polymer; and
wherein, when component (d) is selected from the group (d3), a specific volume resistance in accordance with IEC 60093 of not more than $10^9$ ohm*m is achieved.

14. The polymer composition according to claim 1, further comprising:
wherein the specific surface resistance, in accordance with ICE 60167, of the polymer composition is from $10^{-1}$ to $10^6$Ω.

* * * * *